April 6, 1937. D. T. BROCK 2,076,425
FRICTION CLUTCH
Filed April 8, 1935
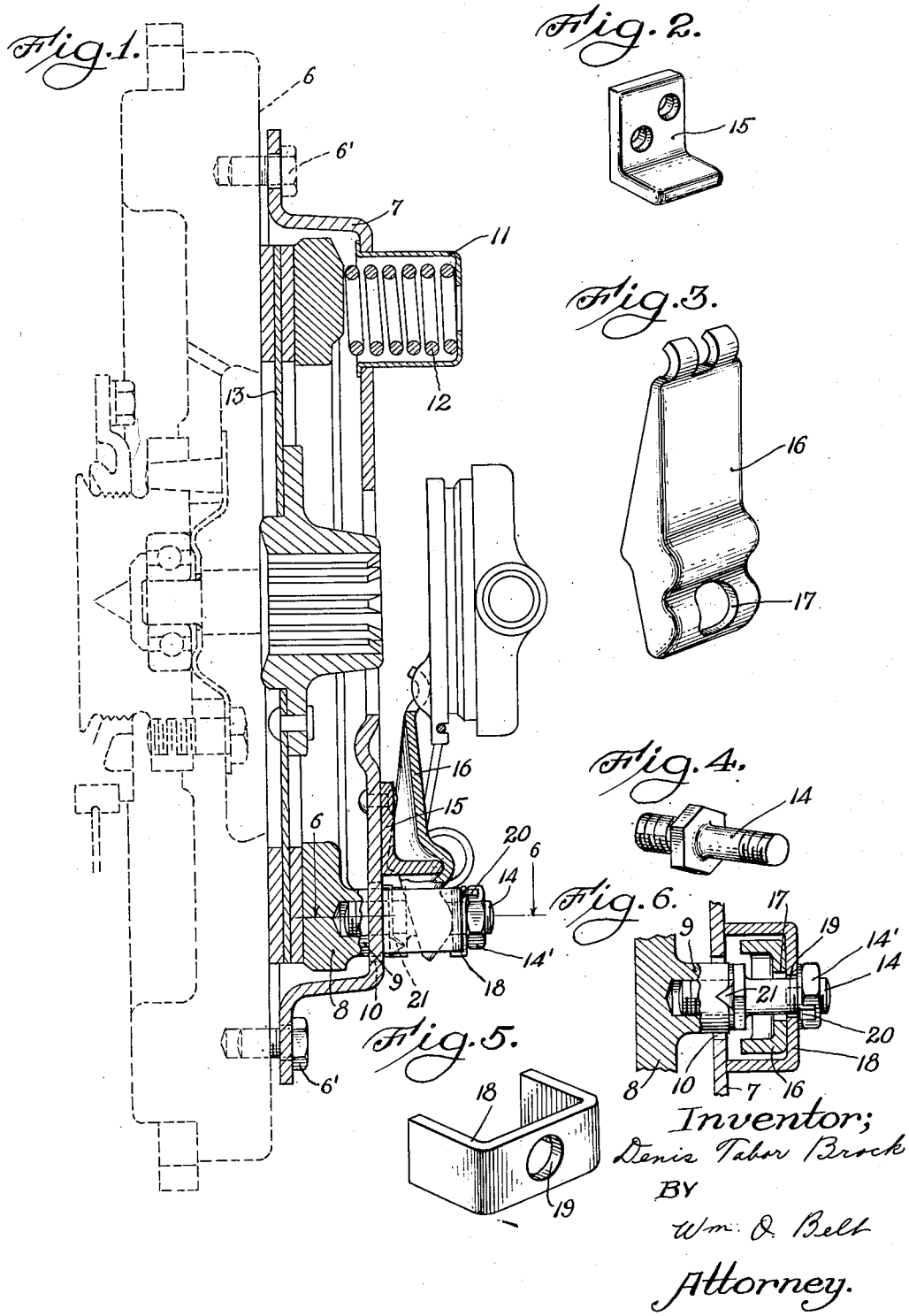
Inventor;
Denis Tabor Brock
BY
Wm. O. Belt
Attorney.

Patented Apr. 6, 1937

2,076,425

UNITED STATES PATENT OFFICE 2,076,425

FRICTION CLUTCH

Denis Tabor Brock, London, England, assignor to Borg-Warner Corporation, Chicago, Ill., a corporation of Illinois Application April 8, 1935, Serial No. 15,165
In Great Britain May 25, 1934

4 Claims. (Cl. 192—68)

This invention relates to friction clutches for automotive vehicles and it may also be used in other friction clutches for which it is or may be adapted.

The primary object of the invention is to provide a friction clutch assembly which can be shipped or transported from a factory or warehouse to a point of installation in an automotive vehicle with the pressure springs compressed but without requiring the use of removable wires or other additional restraining means for this purpose and which will be ready for immediate installation and use.

Other objects of the invention are to provide a friction clutch assembly which is simple in operation and has but few parts which may be easily assembled and each of which is simple and inexpensive to manufacture.

In the accompanying drawing illustrating a selected embodiment of the invention

Fig. 1 is a vertical sectional view of a clutch assembly embodying my invention;

Fig. 2 is a detail perspective view showing a fulcrum plate;

Fig. 3 is a detail perspective view showing a clutch lever;

Fig. 4 is a detail perspective view showing a pressure ring bolt;

Fig. 5 is a detail perspective view showing a locking device; and

Fig. 6 is a detail sectional view on the line 6—6 of Fig. 1.

Referring to the drawing, a pressure plate 8 is mounted within a clutch cover 7 and has bosses 9 thereon extending through openings 10 in the cover. The cover is provided with sockets 11 to receive pressure springs 12 which bear against the pressure plate and tend to force the cover and plate away from each other. The bosses 9 are tapped to receive bolts 14 which have integral nuts thereon substantially midway between their ends and which engage the ends of the bosses when the bolts are in place and the bolts thus constitute pillars extending outwardly from the bosses 9. Fulcrum plates 15, generally L-shaped, are riveted to the cover adjacent the openings 10 and inwardly thereof on the outside of the cover and function as fulcrums for clutch operating levers 16 pivotally mounted thereon. The levers 16 have openings 17 in their outer ends to receive the ends of the bolts 14. Locking devices 18, generally U-shaped, have openings 19 in the intermediate portions thereof to receive the ends of the bolts and the levers are mounted thereon and the locking devices cover the outer ends of the levers to protect them. Nuts 14' are provided on the ends of the bolts to hold the locking devices in place on the bolts and tapped lock washers 20 are provided between the intermediate portions of the locking devices and the nuts 14' to effectively hold them against relative rotative movement. The locking devices also prevent inadvertent rotation of the nuts 14' relative to the bolts by being unrotatable themselves inasmuch as their leg portions will engage the sides of the levers upon any tendency to rotate. The intermediate portions of the locking devices serve as bearings for the ends of the levers. Tabbed lock washers 21 are provided between the bosses 9 and the integral nuts on the bolts 14 to hold the bolts against inadvertent rotation relative to the pressure plate. Inasmuch as the lock washers 21 are of steel harder than the bosses 9, the tabs may bite into the bosses as the bolt 14 is turned in place thereupon.

Before the clutch assembly is installed in a vehicle the ends of the legs of the locking devices engage the cover to prevent movement of the pressure plate and bolt 14 out of the cover by the pressure springs 12. The lever is held in place without the possibility of inadvertent removal by the bolt which passes through the opening 17 in the lever. The spring 12 cannot be removed from the assembly until the pressure plate has been removed and consequently will also be held in place against inadvertent removal during shipment from the factory or warehouse to the point of installation in a vehicle.

To install the clutch assembly in a vehicle the assembly is arranged in the position shown in Fig. 1 with the driven member, or clutch plate 13, between the pressure plate and flywheel 6. The bolts 6' are inserted through openings provided in the cover and threadedly engaged with the flywheel, Fig. 1. The bolts 6' are then drawn up to bring the clutch cover into full engagement with the flywheel which operation will compress the pressure springs 12 and relieve the ends of the legs of the locking device from engagement with the cover and the clutch will be ready to operate as required. The size and arrangement of the parts are designed so that at no time during the normal life of the clutch will the ends of the legs of the locking device engage the cover during operation of the clutch. The maximum wear of the friction facings on the clutch plate is not enough to allow the locking device to engage the cover while the clutch is installed and the bolts 6' are completely drawn up to bring the cover into engagement with the flywheel as previously described.

The invention provides a friction clutch assembly the parts of which are simple and inexpensive to manufacture and easy to assemble, and which may be shipped without the necessity for wiring or otherwise holding the parts in place by means not forming a part of the assembly. Upon installation of the clutch assembly in a vehicle it is only necessary to draw up the bolts 6' to enable the clutch to be fully operative in the vehicle.

The invention is shown and described in a selected embodiment but it is obvious that it may be adapted to friction clutches of many different forms and for many different purposes and I do not limit it to the form herein shown and described but reserve the right to use it in any form and for any purpose for which it is or may be adapted within the scope of the following claims:

I claim:

1. In a friction clutch assembly, a cover having openings therein, a pressure plate, bosses on said pressure plate extending through said openings, bolts mounted on the bosses, clutch operating levers pivotally mounted on the cover and having openings therein to receive said bolts, and locking means mounted on said bolts and operatively interposed between the levers and pressure plate to hold the levers and pressure plate together.

2. In a friction clutch assembly, a cover having openings therein, a pressure plate, bosses on said pressure plate extending through said openings, bolts mounted on the bosses, clutch operating levers pivotally mounted on the cover and having openings therein to receive said bolts, and locking means mounted on said bolts and operatively interposed between the cover and pressure plate to hold the cover and pressure plate together.

3. In a friction clutch assembly, a cover having openings therein, a pressure plate, bosses on said pressure plate extending through said openings, bolts mounted on the bosses, clutch operating levers pivotally mounted on the cover and having openings therein to receive said bolts, and locking means mounted on said bolts and operatively interposed between the pressure plate and levers and between the pressure plate and cover to hold the pressure plate, levers and cover together.

4. In a friction clutch assembly, a cover having openings therein, a pressure plate, members on said pressure plate extending through said openings, clutch operating levers pivotally mounted on said cover and having openings therein to receive said members, and locking means mounted on said members and operatively interposed between the pressure plate and levers, and between the pressure plate and cover to hold the pressure plate, levers and cover together.

DENIS TABOR BROCK.